United States Patent
Wu et al.

(10) Patent No.: US 8,838,618 B1
(45) Date of Patent: Sep. 16, 2014

(54) SYSTEM AND METHOD FOR IDENTIFYING FEATURE PHRASES IN ITEM DESCRIPTION INFORMATION

(75) Inventors: Jianhui Wu, Seattle, WA (US); Nicholas R. Boyd, Berkeley, CA (US); Srikanth Thirumalai, Clyde Hill, WA (US)

(73) Assignee: Amazon Technologies, Inc., Reno, NV (US)

( * ) Notice: Subject to any disclaimer, the term of this patent is extended or adjusted under 35 U.S.C. 154(b) by 204 days.

(21) Appl. No.: 13/175,124

(22) Filed: Jul. 1, 2011

(51) Int. Cl.
*G06F 17/30* (2006.01)

(52) U.S. Cl.
USPC .......................................................... 707/750

(58) Field of Classification Search
CPC .. G06F 17/30616; G06F 1/0335; G06F 17/27
USPC ........... 707/750, 754, 723, 748, 755, 999.003
See application file for complete search history.

(56) References Cited

U.S. PATENT DOCUMENTS

| | | | |
|---|---|---|---|
| 6,549,897 B1 * | 4/2003 | Katariya et al. ....................... 1/1 |
| 7,814,085 B1 | 10/2010 | Pfleger et al. |
| 7,840,448 B2 * | 11/2010 | Musgrove et al. ......... 705/26.64 |
| 7,962,461 B2 * | 6/2011 | Ruhl et al. .................... 707/706 |
| 8,086,504 B1 | 12/2011 | Dicker et al. |
| 8,209,335 B2 * | 6/2012 | Novak ........................... 707/748 |
| 8,301,514 B1 * | 10/2012 | Vippagunta ................... 705/26.7 |
| 2006/0242192 A1 * | 10/2006 | Musgrove et al. ............ 707/102 |
| 2007/0299743 A1 * | 12/2007 | Staib et al. ....................... 705/27 |
| 2008/0065620 A1 * | 3/2008 | Chopra ............................. 707/5 |
| 2008/0109232 A1 * | 5/2008 | Musgrove et al. ................ 705/1 |
| 2008/0215349 A1 * | 9/2008 | Baran et al. ....................... 705/1 |
| 2008/0215571 A1 * | 9/2008 | Huang et al. ...................... 707/5 |
| 2010/0161619 A1 * | 6/2010 | Lamere et al. ................ 707/749 |
| 2011/0208669 A1 * | 8/2011 | Ruhl et al. ..................... 705/347 |

* cited by examiner

*Primary Examiner* — Mohammed R Uddin
(74) *Attorney, Agent, or Firm* — Robert C. Kowert; Meyerton, Hood, Kivlin, Kowert & Goetzel, P.C.

(57) ABSTRACT

Embodiments may include, for each item in a subset of items from a larger group of items, evaluating item description information about that item to identify a respective set of candidate phrases to be evaluated. Embodiments may also include, for each phrase in the sets of candidate phrases, generating multiple component scores based on one or more of the frequency with which that phrase occurs in the item description information for the subset of items and/or the frequency with which that phrase occurs in a corpus of item description information for the overall group of items. Embodiments may also include, for each phrase in the sets of candidate phrases, generating a respective phrase score based on the component scores generated for that phrase. Embodiments may include, based on phrase scores, selecting a subset of phrases from the sets of candidate phrases as being feature phrases for the subset of items.

23 Claims, 5 Drawing Sheets

SYSTEM AND METHOD FOR IDENTIFYING FEATURE PHRASES IN ITEM DESCRIPTION INFORMATION

BACKGROUND

Merchants that operate network-accessible marketplaces may maintain electronic catalogs that include thousands of items (or more) offered for sale. These electronic catalogs often include item detail pages accessible through one or more networks (e.g., web pages accessible over the Internet). These item detail pages often include descriptive information (e.g., text descriptions, pictures or video) in order to assist a buyer in determining whether an item is worth purchasing. In many cases, this descriptive information may be based on information from manufacturers or suppliers of the items offered for sale. In some cases, different manufacturers and suppliers may provide the descriptive information according to different structured formats. The merchant may synthesize this information into lists of features that are useful for categorizing and/or searching for items. As feature sets may vary widely among different product types, identifying these features is not in insignificant undertaking in some cases, particularly for large electronic catalogs with many different items.

While the system and method for identifying feature phrases in item description information is described herein by way of example for several embodiments and illustrative drawings, those skilled in the art will recognize that the system and method for identifying feature phrases in item description information is not limited to the embodiments or drawings described. It should be understood, that the drawings and detailed description thereto are not intended to limit the system and method for identifying feature phrases in item description information to the particular form disclosed, but on the contrary, the intention is to cover all modifications, equivalents and alternatives falling within the spirit and scope of the system and method for identifying feature phrases in item description information as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for identifying feature phrases in item description information are described. Generally, item description information may include any information that is descriptive of an item, such as an item offered in commerce (e.g., for sale or trade). For example, a merchant that offers items for sale may receive item description information from suppliers or manufacturers. For clarity, portions of this description may refer to suppliers alone in some instances. It should be understood that these portions also apply to item manufacturers. In some cases, at least a portion of the item description information may adhere to a structured format, such as a format including structured fields for an item's name, brand, color, product type, weight or other common characteristics. For instance, these characteristics may include general characteristics that are largely applicable to any item offered for sale. For example, in almost all cases, any given item may have a name, brand and product type. Similarly, physical items (as opposed to electronic content, such as downloadable music) will in most cases have physical dimensions and weight. In some cases, a supplier may provide item description information to the merchant when the merchant orders supply of items from the supplier.

While some item description information may include item characteristics that are easily identifiable due to the use of the aforesaid structured fields, item description information may include useful item features that are not explicitly enumerated by the item description information. This information may be found both within and outside of structured fields. For instance, item description information may include a miscellaneous field that includes a textual description of a respective item. For instance, such information might include a few paragraphs of marketing literature that describes a product's features. In other cases, an existing field (e.g., a field that specifies a product name) may specify one or more features for which there is not a structured field. For instance, consider the non-limiting example product name "ACME 52 inch 1080P HDTV with 120 Hz Refresh Rate." While this information may be enumerated as a product name, this information also includes phrases that convey features of the product, such as a specific display resolution (e.g., 1080P) and a specific refresh rate (e.g., 120 Hz). In various embodiments, the presence of theses features may be applicable for some subportion of a larger group of items, such as a particular type of item in a product catalog that include many different types of items. For instance, while display resolutions and refresh rates may be pertinent to televisions and other electronic displays, they may not be relevant to apparel items, such as shirts or pants. In many cases, a merchant may have numerous different types of items within its catalog. As item description information may not explicitly enumerate these types of feature phrases, embodiments may include techniques to identify feature phrases pertinent to different product types. In various embodiments, a given feature phrase may include one or more words that specify a feature or characteristic of an item, such as an item offered in commerce. For example, in various embodiments, a feature phrase may include one or more words (e.g., words from an item's name or product description) that differentiate that item from other similar items.

As described in more detail below, feature phrases, such as those pertinent to a particular item type, may be utilized to provide recommendations for alternative or substitute items. These recommendations may enable consumers to more adequately compare functionally-similar items when browsing a merchant's catalog. In other cases, the feature phrases may be utilized in other ways to assist a customer in the process of identifying items for purchase. For instance, feature phrases may be utilized to scope product searches for customers. Other aspects of various embodiments are described in more detail below.

Subsetting

Figure 1:
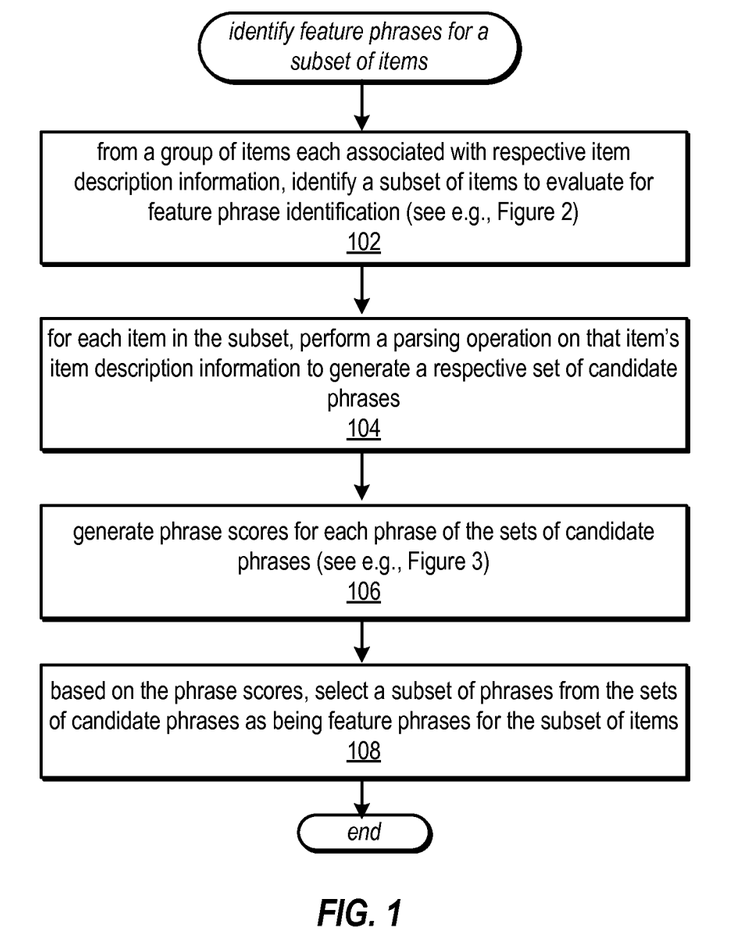
FIG. 1 illustrates a flowchart of an example method for identifying feature phrases for a subset of items from larger group of items, according to some embodiments.

FIG. 1 illustrates an example method for identifying feature phrases for a subset of items from a larger group of items. As illustrated at block 102, the method may include, from a group of items each associated with respective item description information, identify a subset of items to evaluate for feature phrase identification. In various embodiments, this group of items may include a group representative of a given merchant's product catalog. In one non-limiting example, this group may span multiple product types including but not limited to apparel, electronics, outdoor products, tools, and other categories of items. In various embodiments, merchants may categorize items into different categories and in some cases subcategories. Embodiments of the method may include selecting one of these categories or subcategories as the subset of items to be evaluated for feature phrase identification. In some embodiments, items of a particular type or category may be isolated for evaluation because these items may have a higher probability of sharing features relative to items of an entire product catalog.

Figure 2:
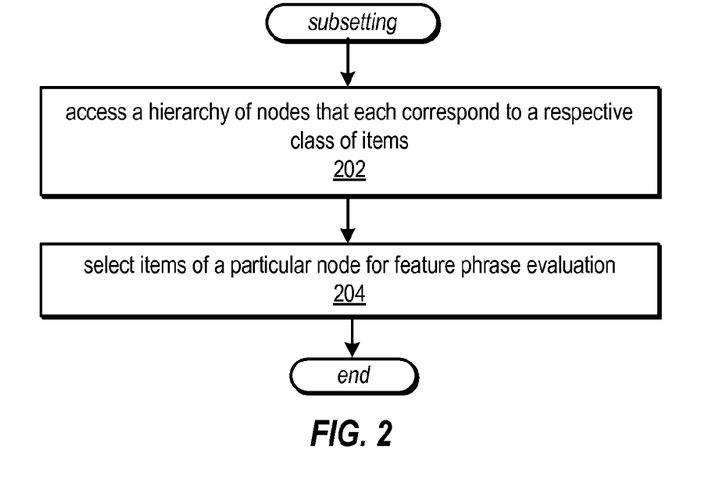
FIG. 2 illustrates a flowchart of an example method for identifying a subset of items from a larger group of items using a node hierarchy, according to some embodiments.

One non-limiting example of a method for determining a particular subset of items in accordance with block 102 is described with respect to FIG. 2, which is described collectively with FIG. 1 herein. FIG. 2 illustrates a flowchart of an example method for identifying a subset of items from a larger group of items using a node hierarchy, according to some embodiments. At block 202, the method may include accessing a hierarchy of nodes that each correspond to a respective class of items. For instance, the hierarchy of nodes may be one or more stored data structures that specify a node hierarchy including at least some nodes categorized under other nodes within the hierarchy. For instance, such a hierarchy may include a parent node encompassing all items in the product catalog. The parent node may have multiple second level nodes corresponding to broad product categories (e.g., apparel, electronics, sporting goods, etc.). These second level nodes may each have one or more children corresponding to subcategories and so on. In one non-limiting example, child nodes of the electronics node could include a laptop computer node and a television node. Generally, each node may correspond to the set of items categorized under that node and any child nodes extending from that node. As illustrated at block 204, the method may include selecting items of particular node for feature phrase evaluation. For instance the method may include selecting a node that corresponds to a particular product sub-group, such as a node corresponding to digital cameras, a node corresponding to men's shirts, or some other node corresponding to a specific product category. In various embodiments, the resulting subset of block 204 may form the subset to be evaluated beginning at block 104 of FIG. 1. Furthermore, in various embodiments, the method of FIG. 1 may be performed for each node in the hierarchy of nodes such that feature phrases are determined for multiple distinct subsets of items.

In various embodiments, other techniques for identifying a subset to evaluate (which may be referred to herein as "subsetting") may be utilized. For instance, in some embodiments, the method may include utilizing a service that, when queried with an item identifier, returns a list of item identifiers of similar items as well as similarity scores between those items and the item of the query. In various embodiments, these similarity scores may be based on customer behavior. For instance, in some embodiments, a higher score may mean that customers often view the queried item and the result item in the same session. In some embodiments, the peakedness of the scores may be reduced with one or more logarithmic functions. Furthermore, the scores may also be normalized (e.g., to sum to one) such that the scores may more easily be compared across different items. In some embodiments, the scores between the queried item and the items of the result list may define a graph representing a preliminary subset of items, which may be traversed to filter out certain items from the subset. For instance, if a product type attribute of the queried item and a respective item from the result list are not equivalent, that respective item may be removed from the subset. This may help avoid the error of having items of different product types evaluated as part of the same subset (e.g., a radiator fan having an "automotive" product type should not reside in the same subset as a table fun having an "appliances" product type. In some embodiments, another filter may be enforced to ensure that the last word in an item type attribute of the queried item matches the last word in the item type attribute for each item of the result list. In case of a mismatch with a given item of the result list, the method may include removing that given item from the subset. In various embodiments, for most product types, these two filtering techniques may result in high precision and recall. In various embodiments, items of the result list (from the queried service) that have not been filtered out according to the above techniques may form a subset to be evaluated at block 104 of FIG. 1.

Parsing

Returning to FIG. 1, as illustrated at block 104, for each item in the subset determined at block 102 (or determined according to the other techniques described above), the method may include performing a parsing operation on that item's item description information to generate a respective set of candidate phrases. For clarity, the item description information described herein may largely be described as an item's name, although embodiments need not be limited to a given item's name. In general, any item description information may be evaluated in various embodiments. Generally, the parsing operation may result in a set of phrases (e.g., n-grams or lists of tokens) that result from tokenizing the name of each item from the subset. This set of phrases may represent the set of candidate phrases determined at block 104. In some cases, the resulting phrases may rarely exceed a certain quantity of tokens (e.g., 4 tokens) in length. Accordingly, in some embodiments, candidate phrases may be limited to n-grams of a specific length (e.g., n<5). Furthermore, in various embodiments, the method may also include avoiding generating n-grams that cross certain predefined words or characters (e.g., "of," "for," "("etc.) in order to avoid generating n-grams that contain multiple candidate phrases. For example, for a digital camera having an item name attribute "A90 12.3 MP Digital SLR Camera by ACME (Body Only)," the aforesaid technique may ensure that the token "ACME (Body Only)" is not included in the set of candidate phrases as "ACME" and "Body Only" may each independently represent a candidate phrase.

In accordance with these techniques, block 104 may result in a respective set of candidate feature phrases for each item in the subset of items determined at block 102. As a non-limiting illustrative example, if a subset determined at block 102 pertained to a digital camera, the respective set of candidate phrases determined at block 104 may include feature phrases from that digital camera's item name (or other item description information), such as "DSLR," "Body Only," "Lens included," "Pop-up flash" or similar feature phrases. In another non-limiting illustrative example, if a subset determined at block 102 pertained to a high definition television, the candidate phrases determined at block 104 may include feature phrases from that television's item name (or other item description information), such as "720p," "1080p," "Plasma," "LCD," "120 Hz" or similar feature phrases. In general, at block 104 a respective set of candidate feature phrases may be generated for each item of the subset of items (identified at block 102). As item description information may be different for different items, the set of candidate feature phrases will vary from item to item. Generally, the more similar two items are (as indicated by their item description information), the larger the overlap in the candidate phrase sets for those items. As one non-limiting example in which an item name is the item description information evaluated, an item having the name "ACME AST820DS Die-Cast Stainless-Steel 2-Slice Toaster" would likely share many candidate feature phrases with another item having the name "ACME AST840DS Die-Cast Stainless-Steel 4-Slice Toaster." In various embodiments, the result of block 104 may include multiple sets of candidate feature phrases, each set generated for a respective item of the subset (identified at block 102).

Filtering and Scoring

Figure 3:
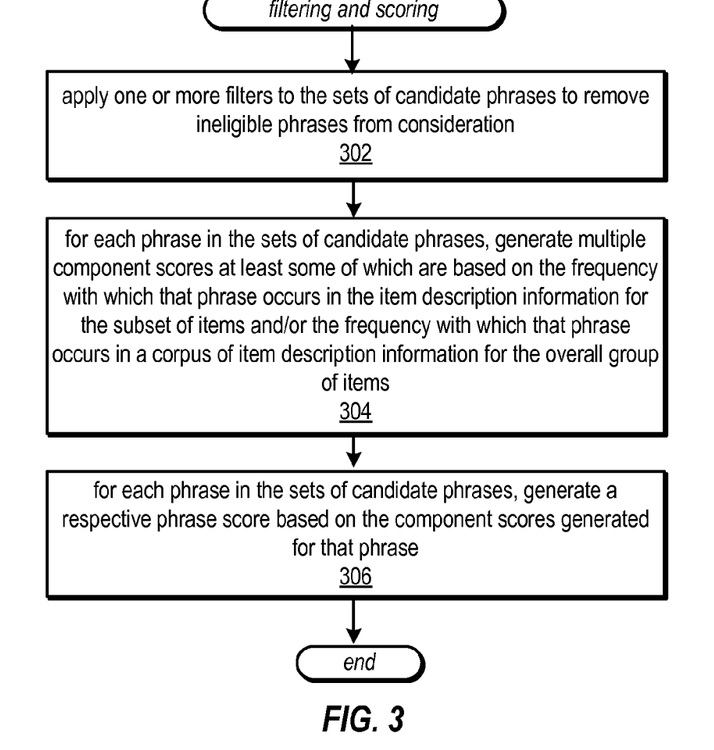
FIG. 3 illustrates a flowchart of an example method for phrase filtering and scoring, according to some embodiments.

As illustrated at block 106, the method may include generating phrase scores fore each phrase of the sets of candidate phrases. In various embodiments, this may be performed for each unique phrase in the sets of candidate phrases. For instance, if a score is generated for a phrase that resides in multiple sets, a phrase score need not be generated for instance of that phrase. Instead, the score may be generated upon encountering that phrase for the first time. Generally, any technique for assigning scores to the candidate phrases may be utilized such that phrases with higher scores are more likely to be feature phrases for the subset (identified at block 102) than phrases with lower scores. FIG. 3, which is described collectively with FIG. 1, illustrates one example of filtering the sets of candidate phrases (generated at block 104) and generating phrase scores for those phrases, according to some embodiments.

As illustrated at block 302, the method may include applying one or more filters to the sets of candidate phrases to remove ineligible phrases from consideration. For instance, in various embodiments, phrases that are very unlikely to be feature phrases may be removed. In one example, all known colors and brands may be removed from consideration; in some cases, these may be extracted by other means, such as by identifying brand name or color name fields from a structured portion of item description information. In other cases, this filter may not be applied and brand names and colors may be identified in the same manner as other feature phrases.

In some embodiments, the method may include filtering out (e.g., eliminating from consideration) all phrases having a document frequency (within the sets of candidate phrases) that is below a predefined and/or configurable level. (One example definition for document frequency is defined below with respect to the description of scoring.) In various embodiments, employing this filtering technique may eliminate phrases that would not be useful in exploring the subset, such as highly obscure phrases. In some embodiments, the meth may include removing one or more phrases having a document frequency (within the sets of candidate phrases) that is above a pre-defined and/or configurable level. In various embodiments, these phrases may describe an overall characteristic (of the sets of candidate phrases) and may not be helpful to in scoping or narrowing a search for an item. In the non-limiting digital camera example above (e.g., "A90 12.3 MP Digital SLR Camera by ACME (Body Only)"), examples of such phrases may include "camera," "digital."

In various embodiments, the method may include filtering out candidate phrases that return too few search results when a search is performed over a merchant's overall catalog. In various embodiments, what constitutes too few search results may be specified by a predefined and/or configurable quantity. In various embodiments of this technique, the quantity of search results may serve as an estimate for the actual document frequency of each phrase within the merchant's overall catalog. For instance, phrases resulting in a quantity of search results below a predefined and/or configurable quantity may be overly-specific product information, such as model numbers.

As illustrated at block 304, the method may include, for each phrase in the sets of candidate phrases, generating multiple component scores at least some of which are based on the frequency with which that phrase occurs in the item description information for the subset of items and/or the frequency with which that phrase occurs in a corpus of item description information for the overall group of items. As noted above with respect to block 106, scoring may be performed for each unique phrase in the sets of candidate phrases. For example, if a score is generated for a phrase that resides in multiple sets, a phrase score need not be generated for each instance of that phrase. Instead, the score may be generated upon encountering that phrase for the first time.

In various embodiments, one type of component score generated for a candidate phrase may include a document frequency score. In some cases, the document frequency score may be analogous to Term Frequency (TF) in information retrieval parlance. In various embodiments, the document frequency (DF) component score for a given phrase in the sets of candidate feature phrases may be defined by the following:

$$DF(p,S) := |\{item \in S | p \in item\}|.$$

In the notation above, S may represent the sets of candidate phrases (each set corresponding to a respective item in the identified subset of items). Furthermore, p may represent a given candidate phrase. In various embodiments, the document frequency may be generated for each unique phrase p within S. Each phrase's document frequency may constitute one component score for that phrase. Other component scores are described in more detail below.

As noted in block 304, at least one of the component scores for a given candidate phrase may be based on the frequency with which that phrase occurs in a corpus of item description information for the overall group of items. One example of this type of component score may include a log inverse document frequency (IDF) of the phrase over the set of item description information that pertains to the larger group of items from which the subset of items was taken (see e.g., block 102). In various embodiments, the log inverse document frequency may be defined by the following:

$$IDF(p) := \log\left(\frac{k}{df(p)}\right).$$

In this case, df(p) may represent the number of results of a search for a given candidate phrase p over the item description information of the larger group of items (e.g., over item description information for a merchant's entire catalog of items). In various embodiments, k may represent the number of documents (e.g., each document being item description information for a given item) within the corpus of item description information. In various embodiments, this component score will be lower for phrases that are very common within the item description of many items (e.g., many items in a merchant's catalog). As the overall phrase score for a phrase is based on this component score, a low IDF component score may in turn reduce the overall phrase score for that phrase. In various embodiments, this may decrease that phrase's probability of being selected as feature phrase for the subset of items (e.g., the subset of items chosen at block 102).

In various embodiments, the method may also include generating another type of component score for a given candidate phrase, which may be referred to as a normalized brand entropy component score. In various embodiments, the normalized brand entropy score may be generated such that phrases with a very high TF-IDF (term frequency—inverse document frequency) but only occur in one or a few brands are assigned a lower score than other phrases that are not limited to just one or a few brands. (Note what constitutes a "few" brands may be a specified and/or configurable parameter.) In various embodiments, this component score may serve to penalize phrases that are primarily brand-specific marketing terms. In various embodiments, the normalized brand entropy (BE) may be defined by the following:

$$BE(p,B) := -\sum_{b \in B} k \frac{df(p,b)}{bf(b)} \log\left(k \frac{df(p,b)}{bf(b)}\right).$$

In this case, p may represent a given phrase being evaluated, B may represent a set of brands, df(p,b) may represent a number of results from a search performed over the item description information of the larger group of items (e.g., the group of items of block 102, an example of which includes a merchant's entire catalog of items), and k may represent a normalization factor defined as:

$$k = \frac{1}{\sum_{b \in B} \frac{df(p,b)}{bf(b)}}.$$

In other embodiments, other techniques may be utilized to generate the normalized brand entropy. For instance, in some cases, the number of brands in which the phrase occurs, or the Kullback-Leibler (KL) divergence between the prior and posterior distributions for brands given that the phrase occurred, and/or the likelihood of the posterior distribution under a probabilistic model may be utilized to generate the normalized brand entropy score according to some embodiments.

As illustrated at block 306, the method may include, for each phrase in the sets of candidate phrases, generating a respective phrase score based on the component scores generated for that phrase. For instance, as described above, the block 304 of the method may include generating a document frequency (DF) component score, an inverse document frequency (IDF) component score, and a normalized brand entropy (BE) score. In various embodiments, these scores may be combined to generate an overall phrase score for each phrase of the sets of candidate phrases. In various embodiments, the phrase score may be generated according to the following:

phrase score(p,S):=DF(p,S)IDF(p)BE(p,B)w(|p|)

In this case, p may represent the phrase for which a phrase score is generated, B may represent the set of brands within the subset, and a w may represent a weight that may be utilized to increase (or decrease) the score of long phrases. For instance, in some embodiments, the weight w may be used to favor a phrase like "Cross-cut paper shredder" over a short phrase, such as "cross-cut." In other cases, shorter phrases may be favored.

In various embodiments, in addition to influencing the phrase score for each candidate phrase with the component scores described above (e.g., TF, IDF, brand entropy), the methods described herein may also include utilizing query data to influence the phrase scores of candidate phrases. For instance, for a given candidate phrase, it may be determined how often that phrase is utilized as a query within an electronic commerce portal. For instance, such a portal might include a merchant-provided portal including a search interface that enables customers to search for and retrieve item detail pages for different items offered for sale. For example, within this type of system, users may submit queries to search for various items offered for sale, and embodiments may store records of such query data. In various embodiments, the higher the frequency of a candidate phrase within query data, the larger the phrase score will be for that candidate phrase. In various embodiments, the conversion rate of query terms may also influence the phrase scores of candidate phrases. An example of a conversion may include a user using a term within a search query followed by the user selecting a search result from a list of search results for that query. In various embodiments, the conversion rate of candidate phrases may also influence the phrase score for a candidate phrase. In one example, the higher the conversion rate of a candidate phrase when used as a query, the larger the phrase score will be for that candidate phrase.

In various embodiments, certain aspects of alphanumeric candidate phrases may be purposely ignored during the method described herein in order to improve the quality of the data. For example, numbers from alphanumeric candidate phrases may be ignored. This may enable phrases that would otherwise have a low score, e.g., "320 gb hard drive" to be considered with a set of similar phrases, e.g., "320 gb hard drive," "250 gb hard drive," and "160 gb hard drive." Any of the techniques described herein may be applied to these types of phrases in order to improve the quality of the feature phrase scores.

Selecting Feature Phrases

Returning to FIG. 1, as illustrated at block 108, the method may include, based on the generated phrase scores, selecting a subset of phrases from the sets of candidate phrases as being feature phrases for the subset of items (e.g., the subset of items determined at block 102). In one embodiment, this may include designating as a feature phrase, any candidate feature phrase having a phrase score above a configurable threshold. In some cases, one or more rules may be applied to the selection of features that cause the exclusion of some candidate phrases from being designated as feature phrases even if the phrase scores of the candidate phrases meet the requisite threshold. For instance, in one embodiment, the method may include applying a rule that specifies a given phrase cannot be selected as a feature phrase if that phrase is wholly contained within another phrase that has already been selected as a feature phrase. For instance, if the phrases "auto" and "off" were evaluated after the phrase "auto off" were selected as a feature phrase, the phrases "auto" and "off" may be excluded in accordance with such a rule. In various embodiments, other techniques may be utilized for ruling out candidate phrases as feature phrases. Described above is a scenario in which a phrase is eliminated based on that phrase being a subset of a phrase already designated as a feature phrase; however, in other embodiments, similar techniques may be employed for supersets. In some embodiments, a given candidate phrase may be eliminated from consideration as a feature phrase if that candidate phrase ends in a number. In another example, phrases that are known item types (e.g., based on a stored dictionary of known item types) may be eliminated from consideration as a feature phrase. For instance, the term "blender" could be eliminated because it is known as an item type and not an item feature. In other embodiments, variations or combinations of the aforesaid techniques may be utilized.

In various embodiments, the illustrated methods (e.g., FIGS. 1-3) may be performed for each of multiple subsets (see e.g., subset at block 102). For instance, different subsets may correspond to different item or product types. A few non-limiting examples may include subsets corresponding to digital cameras, high definition televisions, outdoor furniture, or some other category of items. In this way, embodiments may include performing multiple instances of the methods described herein in order to determine a set of feature phrases for each of the different subsets. In various embodiments, records that specify a given subset's feature phrases may be stored within a data store (e.g., data store 510) for later use, such as for generating item recommendations or for scoping a search for a particular type of item.

Figure 4:
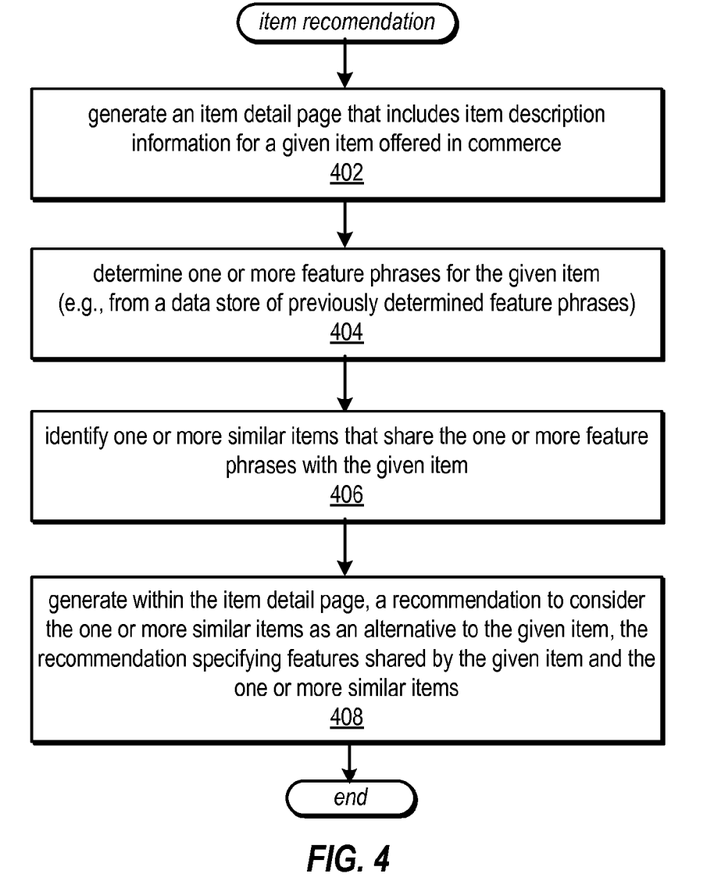
FIG. 4 illustrates a flowchart of an example method for using feature phrases to provide item recommendations, according to some embodiments.

FIG. 4 illustrates an example method for utilizing the feature phrases described herein in order to generate one or more item recommendations. As illustrated at block 402, the method may include generating an item detail page that includes item description information for a given item offered in commerce. In various embodiments, item detail pages may be network accessible content (e.g., a web page) that includes descriptive information for items offered in commerce. In some cases, item detail pages may also include one or more user interface elements for initiating various actions, such as searching for other items and/or purchasing functions (e.g., a control to purchase an item or add an item to an electronic shopping cart). An example item detail page is described in more detail with respect to FIG. 6 below.

As illustrated at block 404, the method may include determining one or more feature phrases for the given item. For instance, this may include utilizing the techniques described above (e.g., FIGS. 1-3) to generate a set of feature phrases for the given item's product type. In other cases, the set of feature phrases for the given item's product type may already be generated and stored, such as on a data store of previously determined feature phrases (e.g., data store 508 described below).

As illustrated at block 406, the method may include identifying one or more similar items that share the one or more feature phrases with the given item. For instance, these similar items may be items within the same product group as the item of the item detail page. The similar items may also share one or more feature phrases for that product group with the item of the item detail page. As illustrated at 408, the method may also include generating within the item detail page, a recommendation to consider the one or more similar items as a substitute for the item of the item. For instance, a widget or other content could be generated within the item detail page. In one example, this content may include pictures, text description, and/or hyperlinks to item detail pages for the recommended items. In various embodiments, the recommendation may also specify one or more features that the given item shares with the one or more similar items. For instance, this may provide a customer with insight into why a merchant selected the one or more similar items as an alternative to the original item. Additional details about an example item recommendation are described below with respect to FIG. 6.

Figure 5:
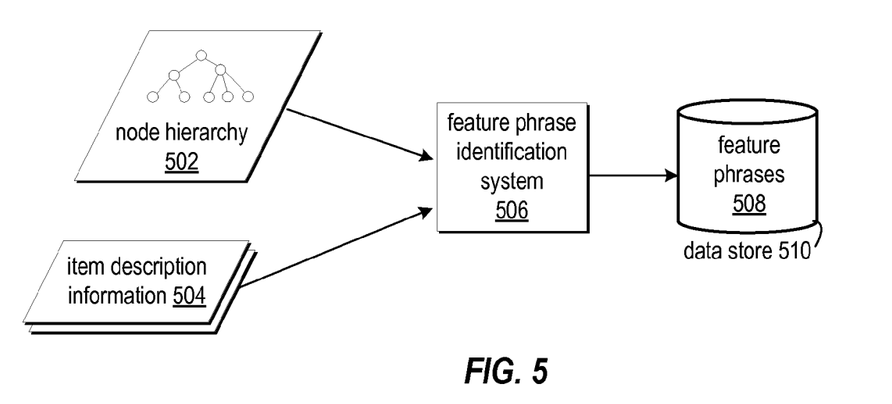
FIG. 5 illustrates an example system for identifying feature phrases for various items, according to some embodiments.

FIG. 5 illustrates an example system for identifying feature phrases for various items. In the illustrated embodiments, item description information 504 may include any of the item description information described herein. For instance, item description information may represent the item description information that a merchant stores for all items in that merchant's product catalog. Furthermore, node hierarchy 502 may include any node hierarchy described herein. As described above, the hierarchy of nodes may be one or more stored data structures that specify a node hierarchy including at least some nodes categorized under other nodes within the hierarchy. For instance, such a hierarchy may include a parent node encompassing all items in the product catalog. The parent node may have multiple second level nodes corresponding to broad product categories (e.g., apparel, electronics, sporting goods, etc.). These second level nodes may each have one or more children corresponding to subcategories and so on. In one non-limiting example, child nodes of the electronics node could include a laptop computer node and a television node. Generally, each node of node hierarchy 502 may correspond to the set of items categorized under that node and any child nodes extending from that node.

The feature phrase identification system 506 may be configured to evaluate the item description information to generate feature phrases 508 for different subsets of items (e.g., different item or product types). In various embodiments, feature phrase identification system 506 may store generated feature phrases 508 within a data store 510 for later use (e.g., to generate item recommendations or to perform search scoping). In various embodiments, feature phrase identification system 506 may evaluate the item description information 504 and node hierarchy 502 according to the methods described herein (e.g., FIG. 1-3) in order to generate feature phrases 508. In various embodiments, feature phrase identification system 506 may be implemented by one or more computers, such as computer 700 of FIG. 7.

Figure 6:
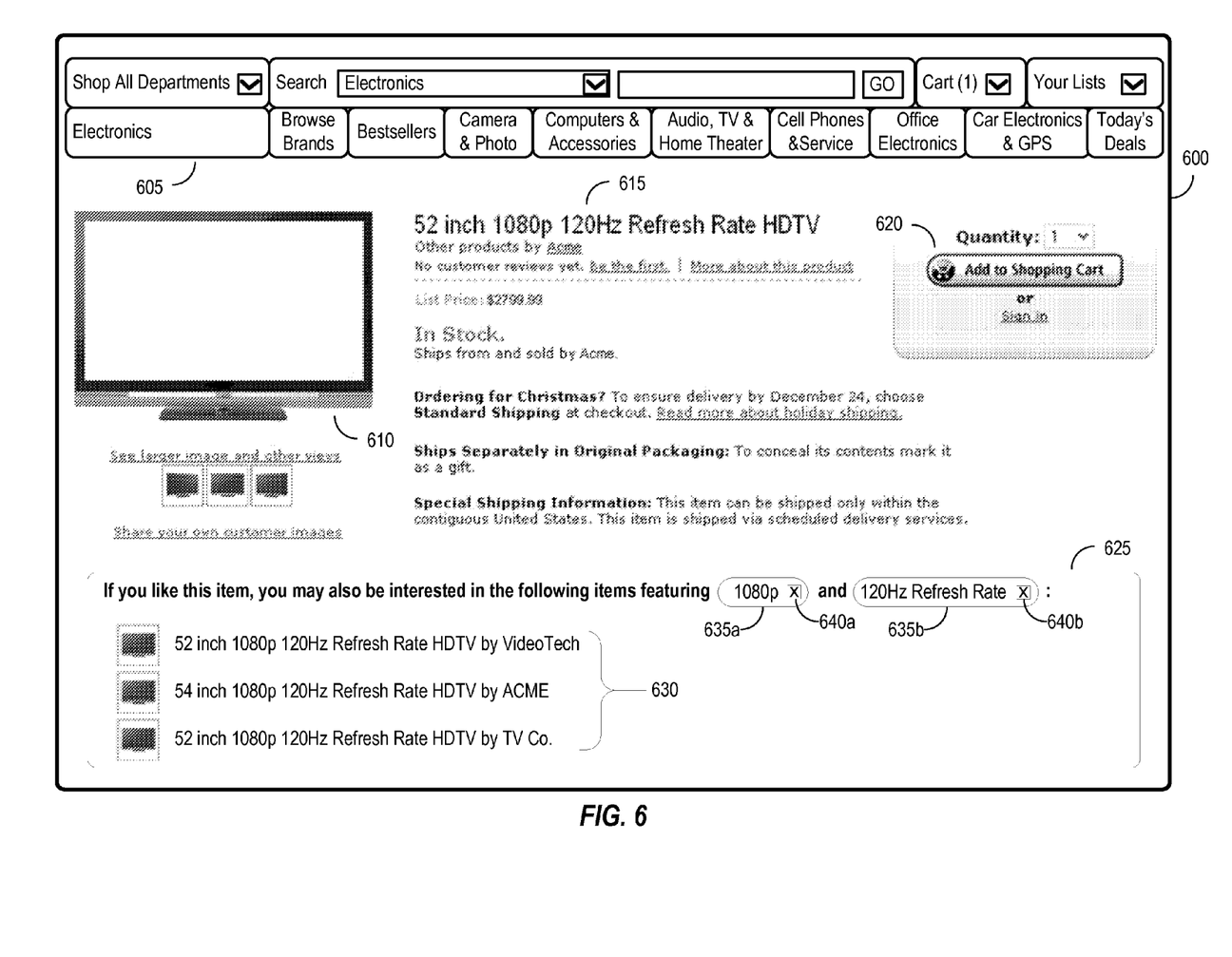
FIG. 6 illustrates an example item detail page that includes item recommendations generated based on identified feature phrases, according to some embodiments.

FIG. 6 illustrates an example item detail page that includes item recommendations generated based on the feature phrases described herein. In the illustrated embodiment, item detail page 600 may represent content of an electronic marketplace, such as that provided by a merchant. In various embodiments, item detail page 600 may represent content that is provided to a customer's client device. Item detail page 600 may include one or more controls 605 for navigating the merchant's electronic marketplace. In various embodiments, item detail page 600 may also include graphical representations of item description information, such as item picture(s) 610 and text description(s) 615 described the item. In various embodiments, the item detail page may also include one or more controls for purchasing the item, such as controls 620.

Content 625 of the item detail page may include one or more recommendations 630. In various embodiments, these recommendations may be generated according to the techniques describe above with respect to FIG. 4, for example. In the illustrated embodiment, content 625 may also include an explanation as to why recommendations 630 recommended certain items. In the illustrated example, the explanation provided indicates that the recommended items were selected because they share feature phrases 635a and 635b with item 615 of the item detail page. In various embodiments, recommendations 630 may be updated dynamically (e.g., within the same item detail page) based on input from a user (e.g., a customer). For instance, the user may select controls 640a or 640b to remove the respective feature phrases. If a feature phrase is removed, recommendations 630 may be updated with new items that are not required to have that particular feature phrase. In this way, the scope of the search for a recommended item may be expanded. In other cases (not illustrated), the user may be presented with a listing of additional feature phrases that may be selected in order to further refine the scope of the recommended items. In some embodiments, similar technique may be utilized in order to scope a search for one or more items with feature phrases.

Example Computer System

Various embodiments of the system and method for identifying feature phrases in item description information, as described herein, may be executed on one or more computer systems, which may interact with various other devices. Note that any component, action, or functionality described above with respect to FIGS. 1-6 may be implemented on one or more computers configured as computer system 700 of FIG. 7, according to various embodiments. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

Figure 7:
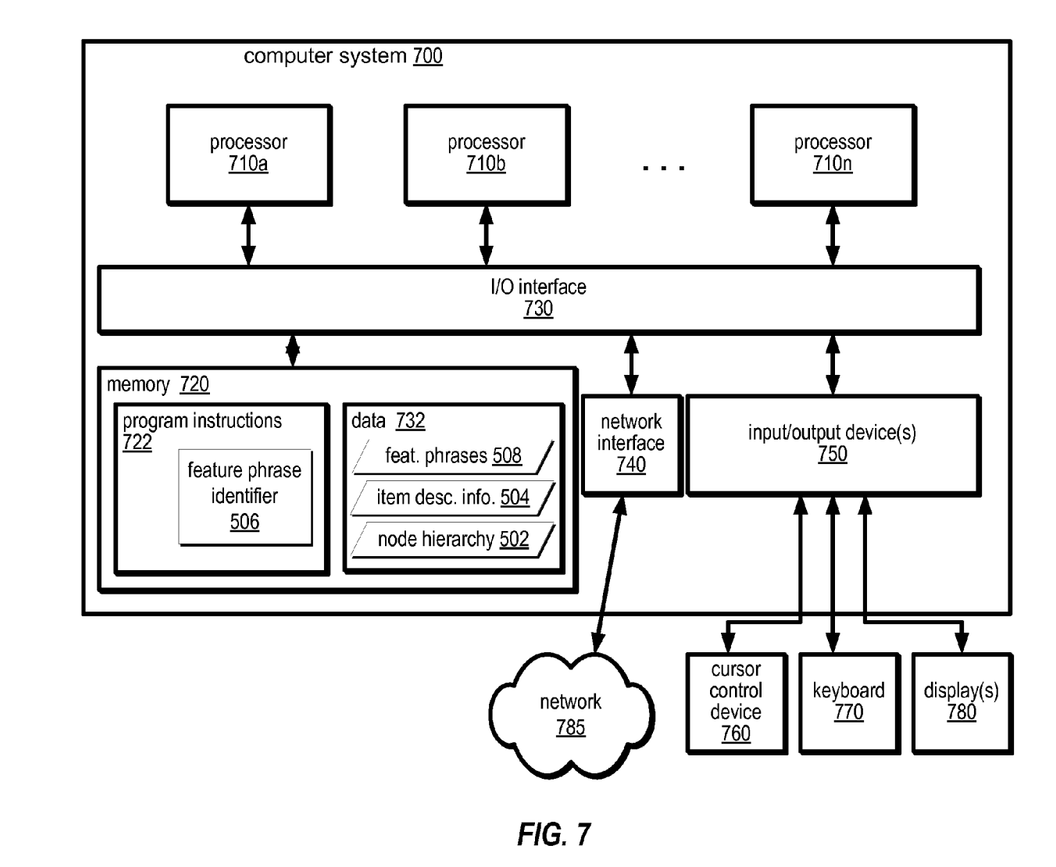
FIG. 7 illustrates one example of a computer system suitable for implementing various elements of the system and method for identifying feature phrases in item description information, according to some embodiments.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions 722 may be configured to implement any functionality of the feature phrase identifier 506 described above. Additionally, data 732 of memory 720 may store any of the information or data structures described above, including but not limited to feature phrases 508, item description information 504, and node hierarchy 502. In some embodiments, program instructions and/or data may be received, sent or stored upon different types of computer-accessible media or on similar media separate from system memory 720 or computer system 700. While computer system 700 is described as implementing the functionality of functional blocks of previous Figures, any of the functionality described herein may be implemented via such a computer system.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network 785 or between nodes of computer system 700. Network 785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 722, which may be processor-executable to implement any element or action described above. In one embodiment, the program instructions may implement the methods described above, such as the methods illustrated by FIGS. 1-4. In other embodiments, different elements and data may be included. Note that data 732 may include any data or information described above.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising:

from a group of items each associated with respective item description information, identifying a subset of items to evaluate for feature phrase identification, wherein the subset of items are related to one another and include a plurality of items that are less than all of the overall group of items;

for each item in the subset, performing a parsing operation on the item description information of that item in order to generate a respective set of candidate phrases comprising one or more words;

applying one or more filters to the multiple sets of candidate phrases to remove ineligible phrases from consideration;

for each phrase in the sets of candidate phrases, generating multiple component scores comprising:
a document frequency component score indicating the frequency with which that phrase occurs in the item description information for the subset of items,
an inverse document frequency component score indicating the frequency with which that phrase occurs in a corpus of item description information for the overall group of items, and
a brand entropy component score, wherein the brand entropy component score penalizes candidate phrases that only occur in item description information of a specified quantity of different item brands;

for each phrase in the sets of candidate phrases, combining the multiple component scores generated for that phrase to generate a respective phrase score for that phrase;

based on the phrase scores, selecting a subset of phrases from the sets of candidate phrases as being feature phrases for the subset of items; and within an item detail page to be provided to one or more users, generating information that indicates at least some of the feature phrases are features of one or more items from the subset of items.

2. The computer-implemented method of claim 1, wherein the item detail page is associated with a particular item of said subset of items, wherein the method comprises:

generating within the item detail page, a recommendation to purchase one or more other items of the subset of items, wherein the recommendation specifies one or more of the feature phrases as being features shared by the particular item and the one or more other items of the subset of items.

3. A computer-implemented method, comprising:

from a group of items each associated with respective item description information, identifying a subset of items to evaluate for feature phrase identification, wherein the subset of items are related to one another and include a plurality of items that are less than all of the overall group of items;

for each item in the subset, performing a parsing operation on the item description information of that item in order to generate a respective set of candidate phrases comprising one or more words;

for each phrase in the sets of candidate phrases, generating multiple component scores comprising:
a document frequency component score indicating the frequency with which that phrase occurs in the item description information for the subset of items, and
an inverse document frequency component score indicating the frequency with which that phrase occurs in a corpus of item description information for the overall group of items;

for each phrase in the sets of candidate phrases, combining the multiple component scores generated for that phrase to generate a respective phrase score for that phrase;

based on the phrase scores, selecting a subset of phrases from the sets of candidate phrases as being feature phrases for the subset of items, wherein said selecting comprises applying a rule that specifies a given phrase cannot be selected as a feature phrase for the identified subset of items if that phrase is wholly contained within another phrase that has already been selected as a feature phrase for the identified subset of items.

4. The method of claim 3, wherein identifying a subset of items to evaluate for feature phrase identification comprises:

receiving information specifying a hierarchy of nodes, wherein each node corresponds to a respective class of items; and based on the hierarchy of nodes, select items of a particular node for feature phrase identification.

5. The method of claim 3, wherein generating said document frequency component score indicating the frequency with which that phrase occurs in the item description information for the subset of items comprises generating that component score based on a term frequency (TF) of the given phrase over the item description information for the subset of items.

6. The method of claim 3, wherein generating said inverse document frequency component score indicating the frequency with which that phrase occurs in a corpus of item description information for the overall group of items comprises generating that component score based on an inverse document frequency (IDF) of the given phrase over said corpus of item description information.

7. The method of claim 3, wherein selecting a subset of phrases from the sets of candidate phrases as being feature phrases for the subset of items is performed in response to determining that each phrase in said subset is associated with a phrase score that is equal to or greater than a specified threshold score.

8. The method of claim 3, wherein the method comprises generating an item detail page for a given item, wherein the method further comprises generating within the item detail page, a recommendation to consider one or more similar items as an alternative to the given item; wherein the recommendation specifies feature phrases shared by the given item and the one or more similar items.

9. A system, comprising:

a memory; and one or more processors coupled to the memory, wherein the memory comprises program instructions executable by the one or more processors to:

from a group of items each associated with respective item description information, identify a subset of items to evaluate for feature phrase identification, wherein the subset of items are related to one another and include a plurality of items that are less than all of the overall group of items;

for each item in the subset, evaluate the respective item description information to identify a respective set of candidate phrases;

for each phrase in the sets of candidate phrases, generate multiple component scores comprising:

a document frequency component score indicating the frequency with which that phrase occurs in the item description information for the subset of items, an inverse document frequency component score indicating the frequency with which that phrase occurs in a corpus of item description information for the overall group of items, and a brand entropy component score, wherein the brand entropy component score penalizes candidate phrases that only occur in item description information of a specified quantity of different item brands;

for each phrase in the sets of candidate phrases, combine the multiple component scores generated for that phrase to generate a respective phrase score for that phrase;

based on the phrase scores, select a subset of phrases from the sets of candidate phrases as being feature phrases for the subset of items.

10. The system of claim 9, wherein to identify a subset of items to evaluate for feature phrase identification, the program instructions are configured to:

receive information specifying a hierarchy of nodes, wherein each node corresponds to a respective class of items; and based on the hierarchy of nodes, select items of a particular node for feature phrase identification.

11. The system of claim 9, wherein to generate said document frequency component score indicating the frequency with which that phrase occurs in the item description information for the subset of items, the program instructions are configured to generate that component score based on a term frequency (TF) of the given phrase over the item description information for the subset of items.

12. The system of claim 9, wherein to generate said inverse document frequency component score indicating the frequency with which that phrase occurs in a corpus of item description information for the overall group of items, the program instructions are configured to generate that component score based on an inverse document frequency (IDF) of the given phrase over said corpus of item description information.

13. The system of claim 9, wherein the program instructions are configured to perform the selection of a subset of phrases from the sets of candidate phrases as being feature phrases for the subset of items responsive to determining that each phrase in said subset is associated with a phrase score that is equal to or greater than a specified threshold score.

14. The system of claim 9, wherein the program instructions are configured to apply a rule that specifies a given phrase cannot be selected as a feature phrase for the identified subset of items if that phrase is wholly contained within another phrase that has already been selected as a feature phrase for the identified subset of items.

15. The system of claim 9, wherein the program instructions are configured to generate an item detail page for a given item, wherein the program instructions are further configured to generate within the item detail page, a recommendation to consider one or more similar items as an alternative to the given item; wherein the recommendation specifies feature phrases shared by the given item and the one or more similar items.

16. A non-transitory computer-readable storage medium, storing program instructions computer-executable on a computer to:

for each item in a subset of items from a larger group of items, evaluate item description information about that item to identify a respective set of candidate phrases to be evaluated for feature phrase identification, wherein the subset of items are related to one another and include a plurality of items that are less than all of the larger group of items;

for each phrase in the sets of candidate phrases, generate multiple component scores comprising:
    a document frequency component score indicating the frequency with which that phrase occurs in the item description information for the subset of items, and
    an inverse document frequency component score indicating the frequency with which that phrase occurs in a corpus of item description information for the larger group of items;
for each phrase in the sets of candidate phrases, combine the multiple component scores generated for that phrase to generate a respective phrase score for that phrase, wherein the program instructions are configured to generate the respective phrase scores for at least some of the candidate phrases based on a measure of brand entropy for a respective candidate phrase, wherein a given measure of brand entropy is penalized for candidate phrases that have a requisite term frequency—inverse document frequency (TFIDF) but only occur in item description information of a specified quantity of different item brands; and
based on the phrase scores, select a subset of phrases from the sets of candidate phrases as being feature phrases for the subset of items.

17. The non-transitory medium of claim 16, wherein to identify a subset of items to evaluate for feature phrase identification, the program instructions are configured to:
    receive information specifying a hierarchy of nodes, wherein each node corresponds to a respective class of items; and
    based on the hierarchy of nodes, select items of a particular node for feature phrase identification.

18. The non-transitory medium of claim 16, wherein to generate said document frequency component score indicating the frequency with which that phrase occurs in the item description information for the subset of items, the program instructions are configured to generate that component score based on a term frequency (TF) of the given phrase over the subset of phrases.

19. The non-transitory medium of claim 16, wherein to generate said inverse document frequency component score indicating the frequency with which that phrase occurs in a corpus of item description information for the larger group of items, the program instructions are configured to generate that component score based on an inverse document frequency (IDF) of the given phrase over said corpus of item description information.

20. The non-transitory medium of claim 16, wherein the program instructions are configured to perform the selection of a subset of phrases from the sets of candidate phrases as being feature phrases for the subset of items responsive to determining that each phrase in said subset is associated with a phrase score that is equal to or greater than a specified threshold score.

21. The non-transitory medium of claim 16, wherein the program instructions are configured to apply a rule that specifies a given phrase cannot be selected as a feature phrase for the identified subset of items if that phrase is wholly contained within another phrase that has already been selected as a feature phrase for the identified subset of items.

22. The non-transitory medium of claim 16, wherein the program instructions are configured to generate an item detail page for a given item, wherein the program instructions are further configured to generate within the item detail page, a recommendation to consider one or more similar items as an alternative to the given item; wherein the recommendation specifies feature phrases shared by the given item and the one or more similar items.

23. The non-transitory medium of claim 16, wherein the program instructions are configured to generate the respective phrase scores for at least some of the candidate phrases based on query data that indicates the frequency with which the candidate phrases have been used as queries within a search interface.

* * * * *